United States Patent
Kawasaki

(10) Patent No.: US 11,159,711 B2
(45) Date of Patent: Oct. 26, 2021

(54) IMAGE-CAPTURING APPARATUS

(71) Applicant: CANON KABUSHIKI KAISHA, Tokyo (JP)

(72) Inventor: Ryo Kawasaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/743,054

(22) Filed: Jan. 15, 2020

(65) Prior Publication Data

US 2020/0236290 A1    Jul. 23, 2020

(30) Foreign Application Priority Data

Jan. 17, 2019    (JP) .............................. JP2019-006071
Nov. 1, 2019    (JP) .............................. JP2019-200145

(51) Int. Cl.
   *H04N 5/225*    (2006.01)
   *H04N 5/232*    (2006.01)

(52) U.S. Cl.
   CPC ... *H04N 5/232125* (2018.08); *H04N 5/23216* (2013.01); *H04N 5/23299* (2018.08)

(58) Field of Classification Search
   CPC .................................................. H04N 5/23287
   See application file for complete search history.

(56) References Cited

U.S. PATENT DOCUMENTS 10,033,917 B1    7/2018    Silverstein et al.
2002/0080242 A1*    6/2002    Takahashi .......... H04N 5/23287
                                                   348/207.99

(Continued)

FOREIGN PATENT DOCUMENTS

CN    101324698 A    12/2008
JP    2007-033229 A    2/2007

(Continued)

OTHER PUBLICATIONS

Ugur Cilingiroglu, Sicheng Chen, Member, IEEE, and Emre Cilingiroglu, "Range Sensing With a Scheimpflug Camera and a CMOS Sensor/Processor Chip", XP-001047669, IEEE Sensors Journal. vol. 4, No. I., Feb. 2004 (9 Pages Total).

(Continued)

*Primary Examiner* — Twyler L Haskins
*Assistant Examiner* — Dwight Alex C Tejano
(74) *Attorney, Agent, or Firm* — Cowan, Liebowitz & Latman, P.C.

(57) ABSTRACT

An image-capturing apparatus includes a controller configured to perform tilt control in which an image sensor is tilted about a rotation axis with respect to a plane orthogonal to an optical axis of an image-capturing optical system, a focus position determiner configured to determine a position of a focus lens, a first area detector configured to detect a first area corresponding to the rotation axis in a captured image, and a second area detector configured to detect a second area which is an area to be focused by the tilt control, wherein the focus position determiner determines a third area in which the first area and the second area overlap as a focus position before the tilt control, and wherein the controller performs the tilt control after the position of the focus lens is adjusted so that the third area is in focus.

17 Claims, 11 Drawing Sheets

(56) References Cited

U.S. PATENT DOCUMENTS

| | | | |
|---|---|---|---|
| 2007/0071429 A1* | 3/2007 | Woehler | H04N 5/2259 |
| | | | 396/89 |
| 2009/0087174 A1* | 4/2009 | Otsuka | H04N 5/23287 |
| | | | 396/55 |
| 2011/0193984 A1 | 8/2011 | Kitaya et al. | |
| 2015/0319356 A1 | 11/2015 | Ohara | |
| 2016/0261801 A1* | 9/2016 | Horikawa | H04N 5/23287 |
| 2017/0272657 A1* | 9/2017 | Ito | H04N 5/23287 |
| 2017/0272658 A1 | 9/2017 | Ito | |
| 2019/0199912 A1* | 6/2019 | Nagano | H04N 5/23293 |

FOREIGN PATENT DOCUMENTS

| | | |
|---|---|---|
| JP | 2010-130633 A | 6/2010 |
| JP | 2017-173802 A | 9/2017 |

OTHER PUBLICATIONS

The above patent documents were cited in a European Search Report dated Apr. 5, 2020, a copy of which is enclosed, that issued in the corresponding European Patent Application No. 20151914.7.
Chinese Notice of Allowance, dated Jul. 30, 2021, which is enclosed with an English Translation, that issued in the corresponding Chinese Patent Application No. 202010053059.2.

* cited by examiner

IMAGE-CAPTURING APPARATUS

BACKGROUND OF THE INVENTION

Field of the Invention

The present invention relates to an image-capturing apparatus that performs tilt control and focus control, and more particularly to focus control.

Description of the Related Art

In recent years, cameras have been installed for security purposes in various places such as station platforms and parking lots. In addition to security applications, images captured by cameras are also used for product management in factory lanes. In such various applications, there is a demand for obtaining images with a deep depth of field. However, there is a case where a deep depth of field cannot be obtained depending on image-capturing conditions such as a lens performance, an angle of view, and an aperture. For example, in a deep scene where a road, a passerby, or a car is photographed from a network camera installed on a ceiling, there is a case where a part of an image-capturing area is in focus. In general, there is a method to deepen the depth of field by narrowing an aperture, but under low illuminance, in many cases, a light amount is increased by opening the aperture and maintained by shortening a shutter speed and opening the aperture to reduce a blur of an object. As a result, under these conditions, the depth of field becomes shallow, and there are cases where an image is captured in a state where an entire image-capturing area is out of focus.

In order to solve such a problem, a technique called as the Scheimpflug principle where a focal plane is adjusted by rotating an image-capturing plane such that the image-capturing plane is tilted with respect to an image-capturing optical axis plane orthogonal to an image-capturing optical axis system that captures an image of an object (hereinafter referred to as tilt control) and the depth of field of an image-capturing scene is deepened is generally known. Since the focal plane changes around a rotation axis of the image-capturing plane, it is necessary to adjust a focus on the object that overlaps the rotation axis in advance in the tilt control.

Japanese Patent Application Laid-Open No. 2010-130633 discloses an image-capturing apparatus that performs tilt control by calculating a tilt angle based on tilt information, object distance information, and a focal length. Japanese Patent Application Laid-Open No. 2017-173802 discloses a technique for performing tilt control using a tilt angle calculated based on a focus shift amount of a plurality of focus detection areas.

However, in the image-capturing apparatus disclosed in Japanese Patent Application Laid-Open No. 2010-130633 and Japanese Patent Application Laid-Open No. 2017-173802, it is necessary for a user to adjust a focus according to a position of the object, and it takes a lot of trouble. Also, if the object that does not overlap the rotation axis of the image-capturing plane is focused, a desired depth-of-field expansion effect cannot be obtained even if the tilt control is performed.

SUMMARY OF THE INVENTION

The present invention provides an image-capturing apparatus capable of easily performing focus adjustment suitable for the tilt control.

An image-capturing apparatus according to one aspect of the present invention includes a controller configured to perform tilt control in which an image sensor is tilted about a rotation axis with respect to a plane orthogonal to an optical axis of an image-capturing optical system, a focus position determiner configured to determine a position of a focus lens, a first area detector configured to detect a first area corresponding to the rotation axis in a captured image, and a second area detector configured to detect a second area which is an area to be focused by the tilt control, wherein the focus position determiner determines a third area in which the first area and the second area overlap as a focus position before the tilt control, and wherein the controller performs the tilt control after the position of the focus lens is adjusted so that the third area is in focus.

Further features of the present invention will become apparent from the following description of exemplary embodiments with reference to the attached drawings.

DESCRIPTION OF THE EMBODIMENTS

Hereinafter, embodiments of the present invention will be described with reference to the drawings.

(Overall Configuration)

Figure 1:
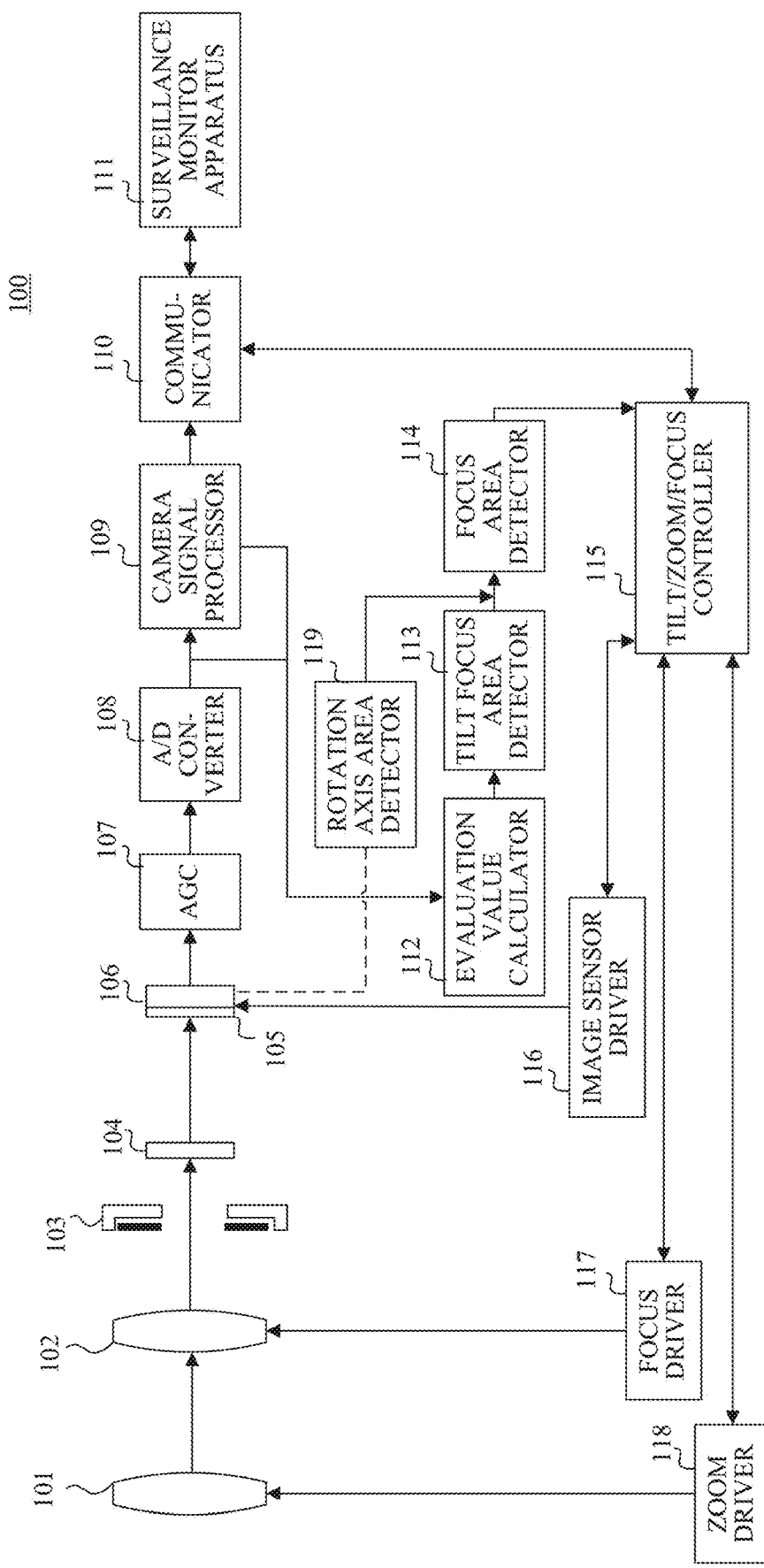
FIG. 1 is a block diagram illustrating a configuration example of an image-capturing apparatus according to first and second embodiments of the present invention.

FIG. 1 shows a configuration of an image-capturing apparatus 100 according to an embodiment of the present invention. An image-capturing optical system includes a zoom lens 101 that moves in an optical axis direction to change a focal length, a focus lens 102 that moves in the optical axis direction to perform focus adjustment, and a diaphragm unit 103 that adjusts a light amount. A light that has passed through the image-capturing optical system forms an object image as an optical image on an image sensor 106 via a hand pass filter (hereinafter referred to as BPF) 104 and a color filter 105.

Some BPFs 104 are movable with respect to an optical path of the image-capturing optical system. The object image is photoelectrically converted by the image sensor 106. An analog electrical signal (image-capturing signal) output from the image sensor 106 is gain-adjusted by an AGC 107, converted into a digital signal by an AD converter 108, and then input to a camera signal processor 109.

The camera signal processor 109 performs various kinds of image processing on a digital image-capturing signal to generate an image signal. The image signal is output to a surveillance monitor apparatus 111 connected to the image-capturing apparatus by wired or wireless communication via a communicator 110. The communicator 110 receives a command from the outside and outputs a control signal such as a command to a tilt/zoom/focus controller 115 (controller, focus position determiner) in the image-capturing apparatus.

An evaluation value calculator 112 receives RGB pixel values or luminance values from the AD converter 108 or the camera signal processor 109 for each of evaluation frames set in the image. Then, an evaluation value (hereinafter referred to as a contrast evaluation value) related to a contrast of a specific frequency used in tilt control or AF control is calculated. A tilt focus area detector (second area detector) 113 detects an area to be focused by the tilt control (hereinafter referred to as a tilt focus area (second area)) based on the contrast evaluation value of each evaluation frame obtained by the evaluation value calculator 112.

A focus area detector (third area detector, fourth area detector) 114 detects a focus area (third area) based on the tilt focus area detected by the tilt focus area detector 113 and a rotation axis area of the image sensor (first area) detected by a rotation axis area detector (first area detector) 119.

The tilt/zoom/focus controller 115 dictates a tilt angle setting position and a zoom setting position, and a focus setting position for an image sensor driver 116 (rotator), a focus driver 117, and a zoom driver 118, respectively, based on an instruction from the communicator 110. Here, the focus setting position before the tilt control is determined based on the focus area detected by the focus area detector 114.

Figure 3:
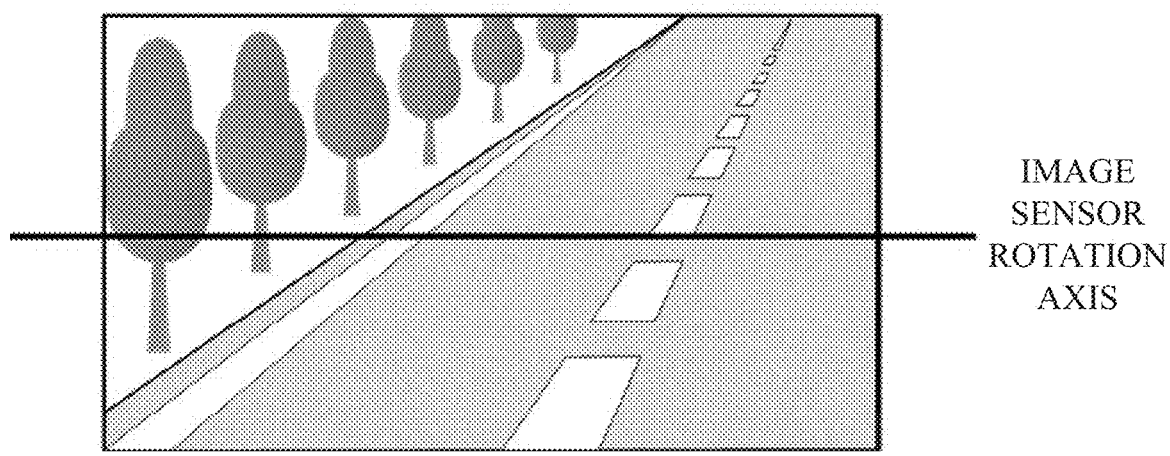
FIG. 3 shows an example of a captured image.

The image sensor driver 116 tilts the image sensor 106 based on the tilt angle setting position dictated from the tilt/zoom/focus controller 115. In most cases, an image sensor rotation axis around which the image sensor 106 tilts is positioned at a center of a captured image as shown in FIG. 3, and the image sensor 106 tilts around the image sensor rotation axis.

The focus driver 117 controls a position of the focus lens 102 based on the focus setting position dictated from the tilt/zoom/focus controller 115. The zoom driver 118 controls a position of the zoom lens 101 based on the zoom setting position dictated from the tilt/zoom/focus controller 115.

Figure 2A:
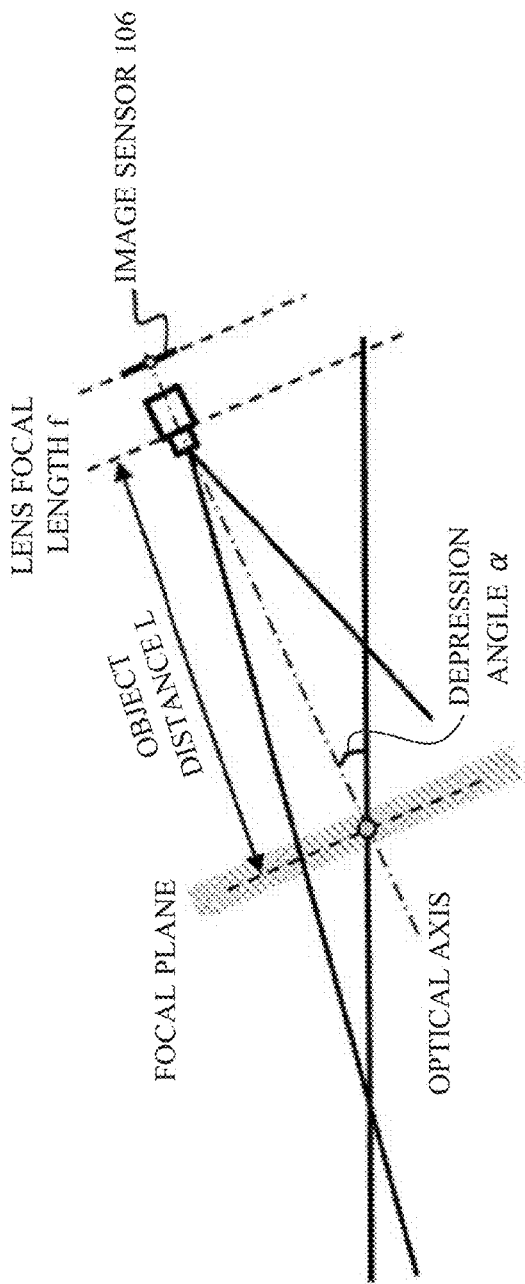
FIGS. 2A and 2B are explanatory diagrams for tilt image-capturing.
Figure 2B:
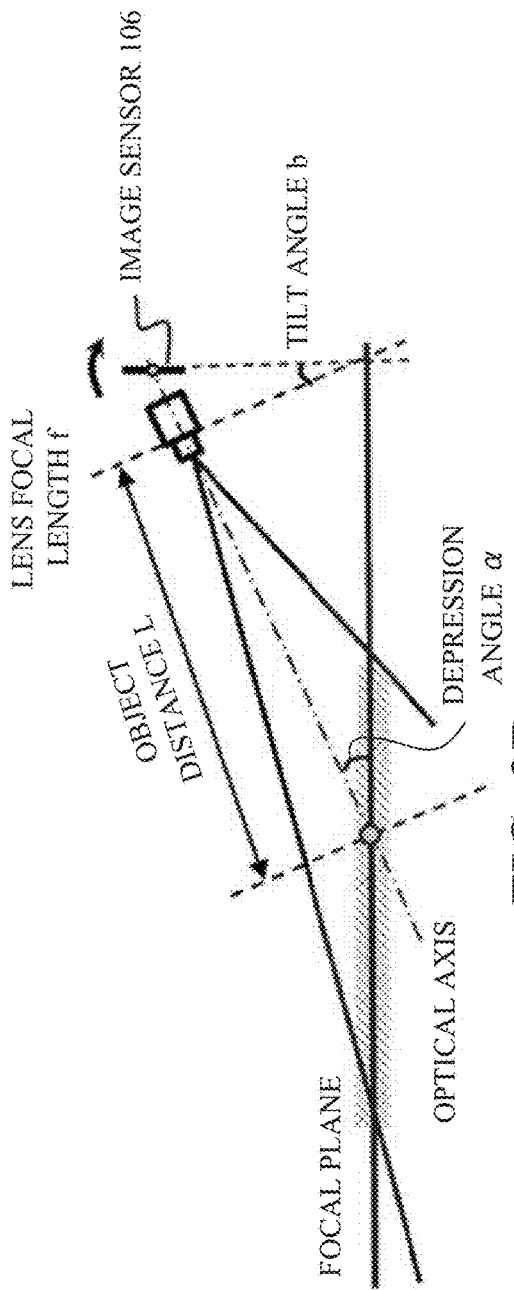

The tilt control will be described with reference to FIGS. 2A and 2B. FIG. 2A shows a state in which the optical system and the image sensor are parallel. A focus is adjusted so that an object distance L is in focus, and the focal plane is parallel to the optical system and the image sensor. FIG. 2B shows a state in which the tilt control is performed by rotating the image sensor around the image sensor rotation axis from the state of FIG. 2A. When the tilt control is performed, the focal plane also rotates around a focal plane rotation axis corresponding to the image sensor rotation axis based on the Scheimpflug principle, so that it becomes possible that all objects from a short distance to a long distance on a certain plane are focused. The Scheimpflug principle is a principle that when a main plane of the optical system and an image-capturing plane of the image sensor intersect with one straight line, the focal plane also intersects on the same straight line. Assuming that a focal length is f, an object distance is L, and a depression angle is α, a tilt angle b is calculated by the following equation (1) based on the Scheimpflug principle.

$$b = \tan^{-1}(f/L \tan \alpha)) \quad (1)$$

Note that the same effect can be obtained even if the tilt control is performed by rotating the image-capturing optical system instead of rotating the image sensor.

A focus adjustment in the tilt control will be described.

Figure 4:
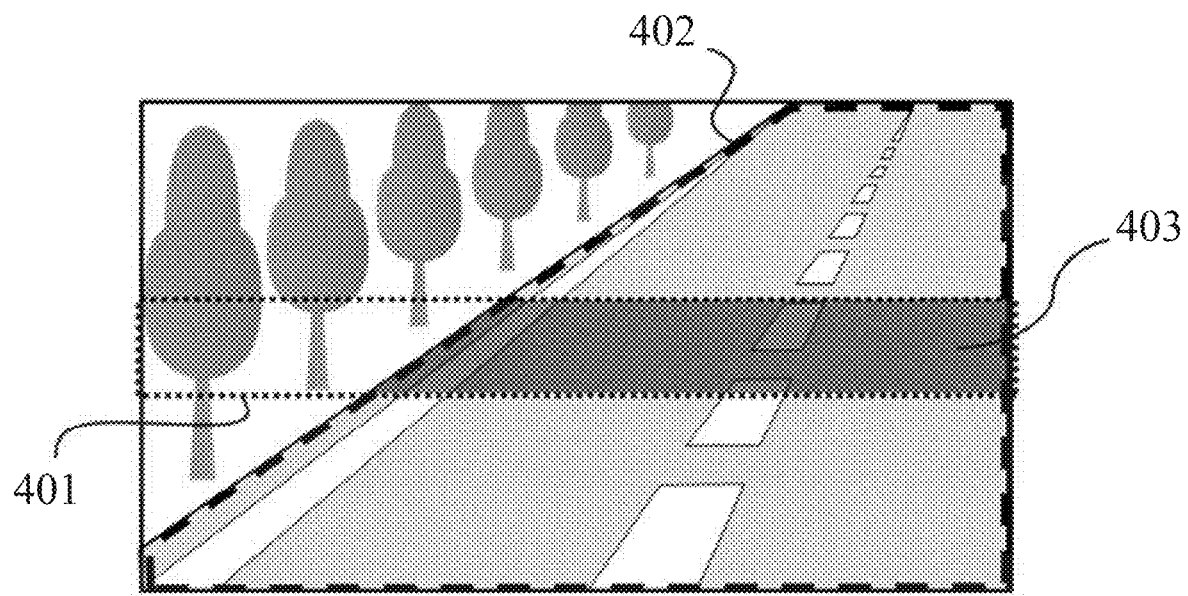
FIG. 4 is an explanatory diagram for each area in a captured image.

From FIG. 2, it can be seen that in order to focus on a desired plane by the tilt control, it is necessary to adjust a focus so that the plane is in focus in an area corresponding to the image sensor rotation axis (hereinafter referred to as an image sensor rotation axis area (first area)). This will be described in more detail with reference to FIGS. 3 and 4. FIG. 3 shows an example of a captured image, and FIG. 4 illustrates each area in FIG. 3. An area 401 is the image sensor rotation axis area, and is an area having a predetermined width with the image sensor rotation axis as a center line. An area 402 is a tilt focus area. At this time, an area 403 that is the image sensor rotation axis area 401 and the tilt focus area 402 is set as a focus area. By performing the focus adjustment so that this focus area 403 is in focus, it is possible to focus on the tilt focus area 402 by the tilt control. On the other hand, if the focus adjustment is performed on an area other than the focus area 403, the tilt focus area 402 cannot be focused even if the tilt control is performed, and thus the user cannot obtain satisfactory results.

Note that the captured image in FIG. 3 is an example, and focus adjustment areas actually differ depending on the image-capturing scene and a position of the image sensor rotation axis. Therefore, in order to perform the focus adjustment in the tilt control with certainty, it is necessary to present the focus area to the user, or for the image-capturing apparatus to automatically detect the focus area and perform the focus adjustment.

First Embodiment

Hereinafter, a process executed by an image-capturing apparatus according to the first embodiment will be described.

Figure 5:
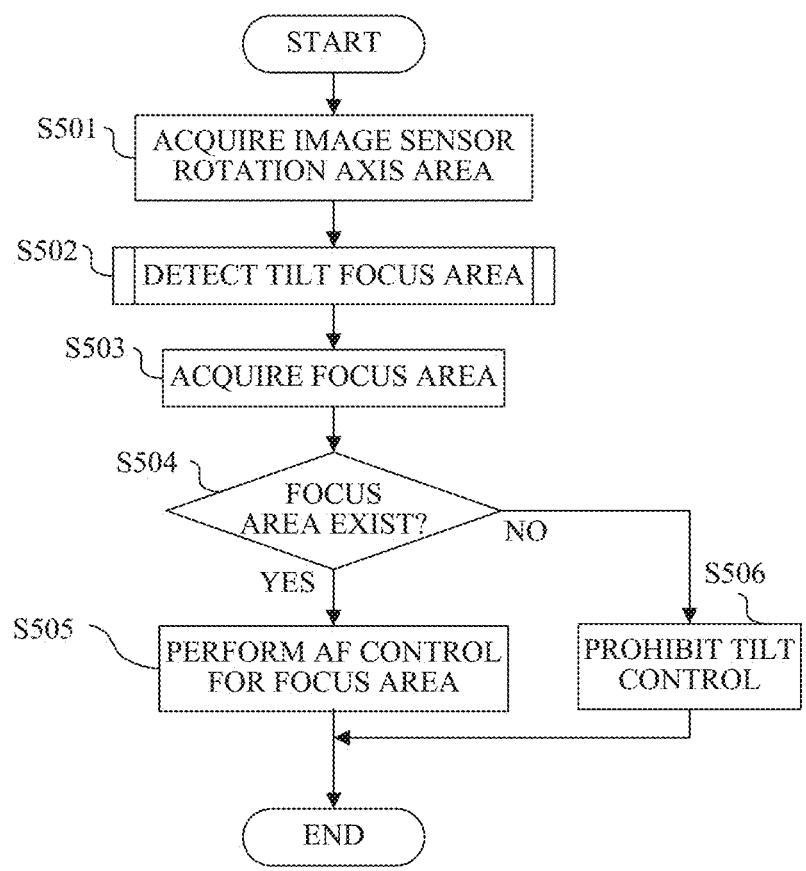
FIG. 5 is a flowchart of a main process executed by the image-capturing apparatus according to the first embodiment.

FIG. 5 is a flowchart showing a main process in this embodiment.
<Step S501>

In step S501, the image sensor rotation axis area is acquired. The image sensor rotation axis area is an area having a predetermined width with the image sensor rotation axis as the center line as shown by the area 401 in FIG. 4 and is set in advance.
<Step S502>

In step S502, the tilt focus area is detected. The detection method will be described later.
<Step S503>

In step S503, the focus area is acquired. The focus area is the image sensor rotation axis area and the tilt focus area as shown by the area 403 in FIG. 4.
<Step S504>

In step S504, it is determined whether or not the focus area acquired in step S503 exists. If it exists, the process proceeds to step S505. If not, the process proceeds to step S506.
<Step S505>

In step S505, if the focus area exists in step S504, AF control is performed so that the focus area is in focus.

<Step S506>

In step S506, the tilt control is prohibited when the focus area does not exist in step S504. This is because when the focus area does not exist, the focus adjustment for adjusting the focal plane to the tilt focus area cannot be correctly performed, and an unintended focal plane can be obtained by performing the tilt control. Here, the tilt control is prohibited as a process in a case where the focus area does not exist. However, for example, a notification may be sent to the user or an image-capturing angle of view may be adjusted so that the focus area exists. Alternatively, it is also possible to roughly perform the focus adjustment by setting an area closest to the image sensor rotation axis area in the tilt focus area as the focus area.

Figure 6:
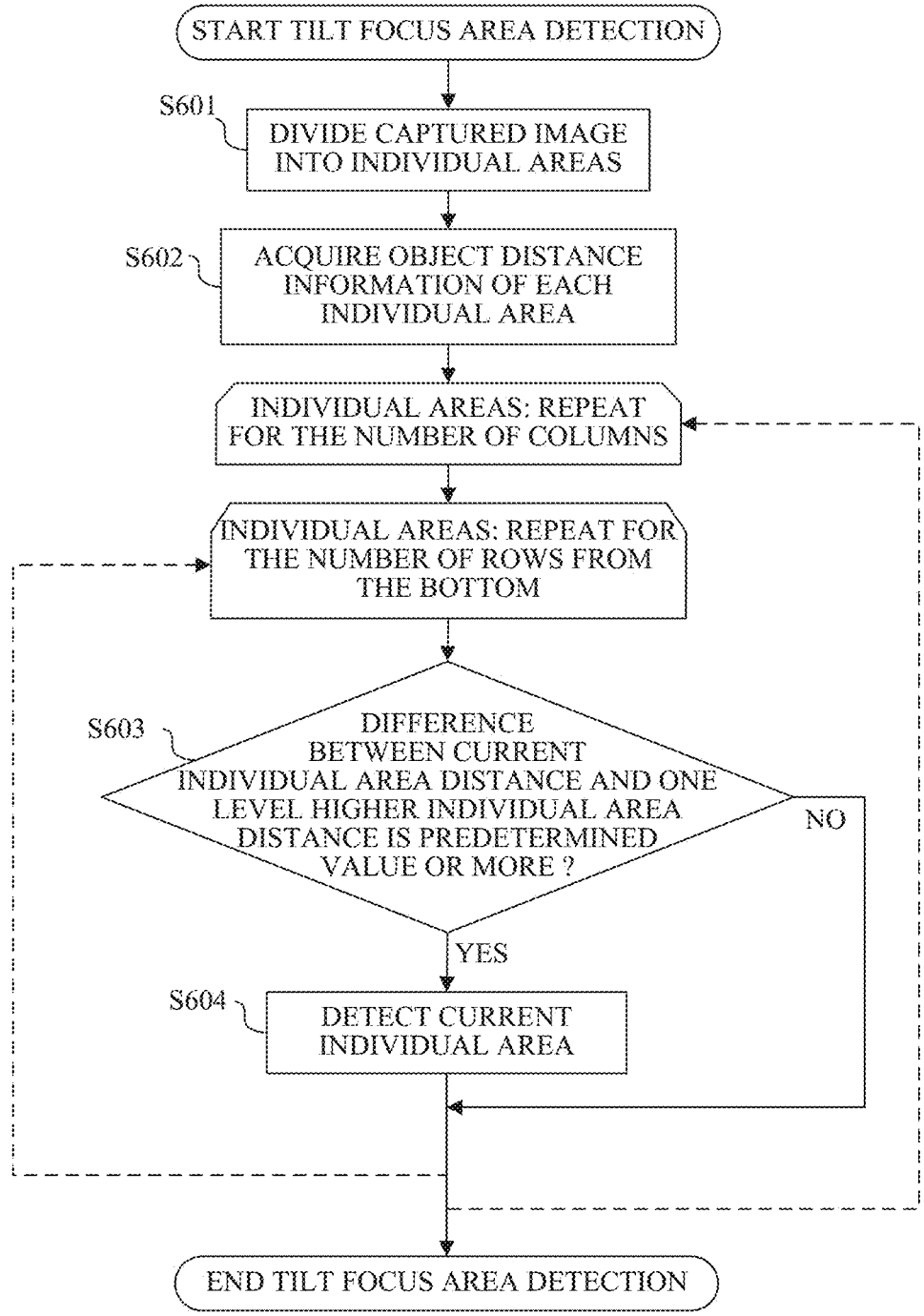
FIG. 6 is a flowchart of a tilt focus area detection process.

Next, a process of the tilt focus area detection (step S502) will described with reference to the flowchart of FIG. 6.

<Step S601>

Figure 7A:
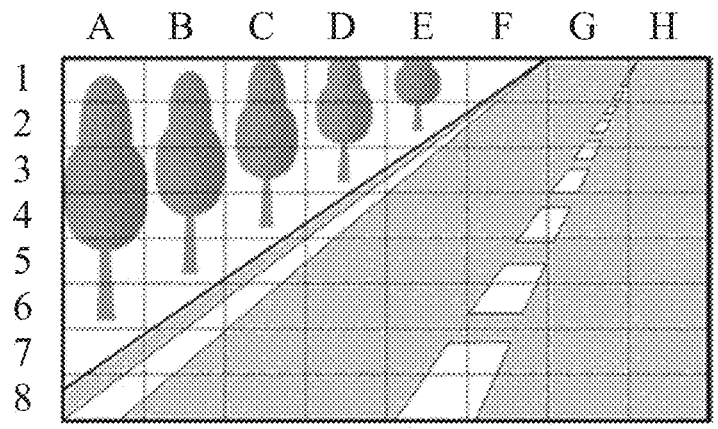
FIGS. 7A-7C are explanatory diagrams for the tilt focus area detection.

In step S601, the captured image is divided into a plurality of individual areas. As an example, FIG. 7A shows an image obtained by dividing the captured image of FIG. 3 into 64 individual areas. The individual area is composed of a single pixel or a collection of a plurality of pixels.

<Step S602>

Figure 7B:
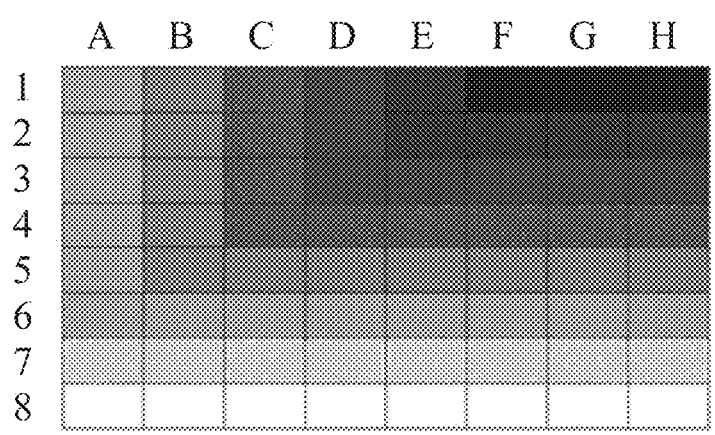

In step S602, object distance information of each individual area is acquired. FIG. 7B shows the object distance information in FIG. 7A, and indicates that the object distance is farther as the density is higher. The object distance information can be estimated by acquiring a contrast evaluation value for each individual area while driving the focus lens 102 and detecting an optimum focus position at which the evaluation value reaches a peak. However, the acquisition method of the object distance information is not limited to the estimation based on the optimum focus position, and may be acquired using, for example, a ranging sensor.

<Step S603>

Figure 7C:
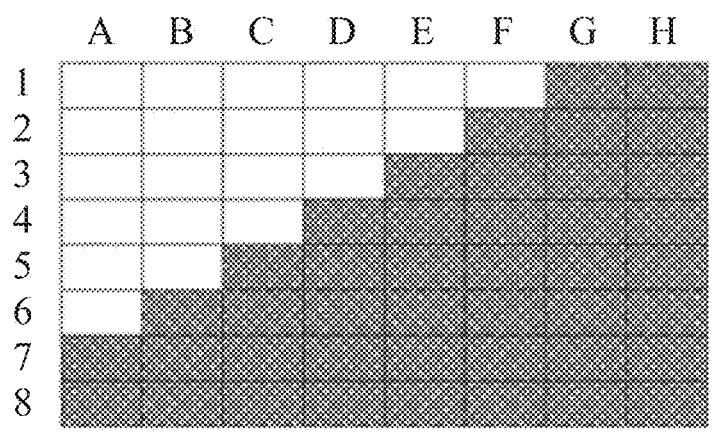

In step S603, a determination for detecting the tilt focus area is performed based on the object distance information in each individual area obtained in step S602. Since the tilt focus area is the focal plane in FIG. 2B, it can be considered that the object distance gradually increases from the front to the back in the tilt focus area. Therefore, the tilt focus area can be detected by comparing object distances from the bottom individual area to the top individual area in order for each column of individual areas, and determining whether the object distance of the upper individual area of a pair of adjacent individual areas is more than or equal to a predetermined distance with respect to the object distance of the lower individual area (i.e. whether a difference between the object distance information of a pair of adjacent individual areas is more than or equal to a predetermined value) (hereinafter referred to as an object distance determination). The object distance determination for one column will be described using column A as an example. Since in an eighth row of the column A and a seventh row, which is one row higher, the object distance in the seventh row is longer. Then, the eighth row of the column A is detected as the tilt focus area in the subsequent step S604. Next, the process proceeds to the object distance determination in the seventh and sixth rows. If the object distance determination is repeated in this way, the object distance determination in the sixth and fifth rows gives an equal object distance. In this case, since there is a three-dimensional object (a tree in the captured image 300), they are not detected as the tilt focus area. Thereafter, in the object distance determination up to the first row, the areas with the same object distance continue and thus the tilt focus area is not detected. As a result, in the column A, the eighth and seventh rows are detected as the tilt focus area. When the same process as described above is performed for other individual area columns, the tilt focus area is detected as shown in FIG. 7C. That is, the tilt focus area is an area where the object distance information in the individual area continuously changes in a direction orthogonal to the image sensor rotation axis. More precisely, when the object distance information is acquired sequentially from the lowest individual area in a direction orthogonal to the image sensor rotation axis, if a difference between the object distance information of a pair of adjacent individual areas is larger than or equal to a predetermined value, a lower individual area of the pair of individual areas corresponds to the tilt focus area.

In the example shown here, we consider the tilt control in a tilt direction, and the object distance determination between the upper and lower individual areas is performed, but in a case of the tilt control in a pan direction, for each row of the individual areas, the object distance between left and right individual areas which are adjacent is determined.

<Step S604>

In step S604, the tilt focus area is detected based on the object distance determination in step S603.

In the first embodiment described above, the image-capturing apparatus automatically detects the focus area and performs the focus adjustment according to the image-capturing scene. Thereby, the focus adjustment suitable for the tilt control can be easily performed, and a desired depth-of-field expansion effect can be obtained in a subsequent tilt control.

Second Embodiment

Hereinafter, a process executed by an image-capturing apparatus according to the second embodiment will be described. Note that the same processes as those in the first embodiment are denoted by the same reference numerals, and description thereof is omitted.

Figure 8:
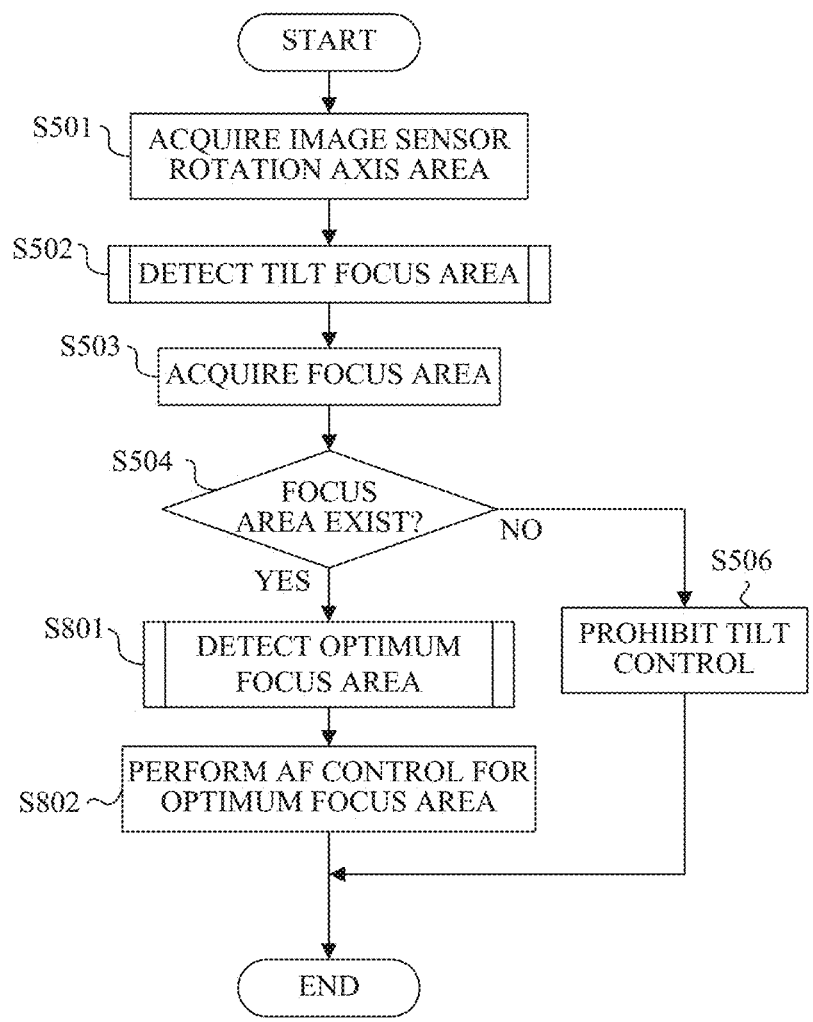
FIG. 8 is a flowchart of a main process executed by the image-capturing apparatus according to the second embodiment.

FIG. 8 is a flowchart showing a main process in this embodiment.

<Step S801>

In step S801, when the focus area exists in step S504, an optimum focus area (fourth area), which is an area where a focusing accuracy is relatively high in a subsequent AF control, is detected from the focus area. The detection method will be described later.

<Step S802>

In step S802, the AF control is performed so that the optimum focus area detected in step S801 is in focus.

Figure 9:
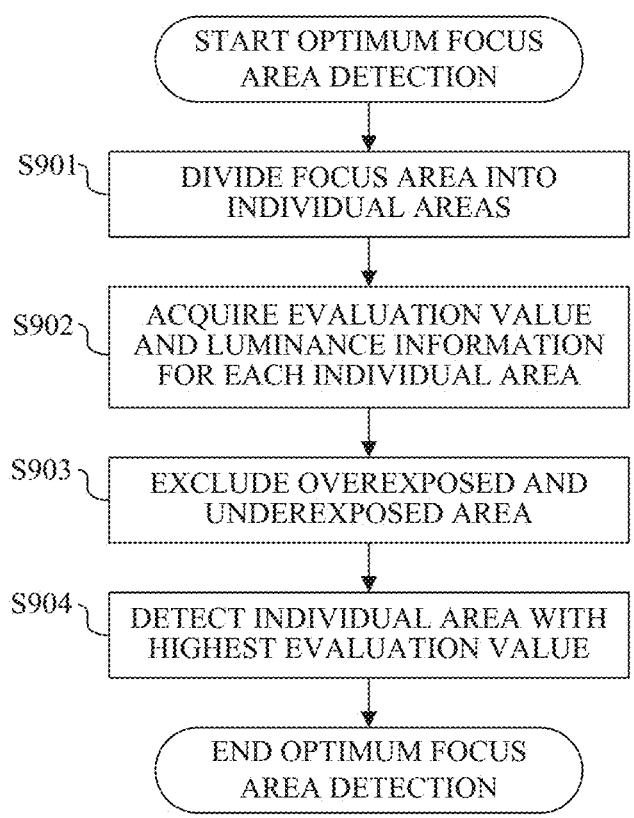
FIG. 9 is a flowchart of an optimum focus area detection process.

Next, a process of detecting the optimum focus area from the focus area (step S801) will be described with reference to the flowchart of FIG. 9.

<Step S901>

In step S901, the focus area is divided into a plurality of individual areas.

Figure 10:
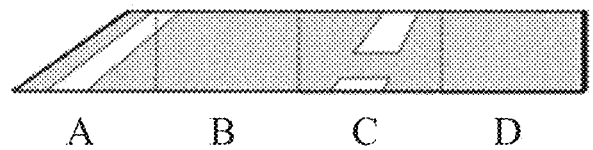
FIG. 10 is an explanatory diagram for the optimum focus area detection.

As an example, FIG. 10 shows the area 403 shown in FIG. 4 divided into four individual areas.

<Step S902>

In step S902, the contrast evaluation value (contrast information) and luminance information of each individual area are acquired.

<Step S903>

In step S903, based on the luminance information acquired in step S902, the individual areas that are overexposed or underexposed are detected, and these are excluded. This is because if the AF control is performed on the overexposed area or the underexposed area, the focusing accuracy is likely to be impaired.

<Step S904>

In step S904, the individual area having the highest contrast evaluation value acquired in step S902 is detected as the optimum focus area among the individual areas excluding the overexposed area and the underexposed area. For example, in FIG. 10, the contrast evaluation values of the individual areas A and C are high because the individual areas A and C include many white lines on a road, and the contrast evaluation value of the individual area D is low because the individual area D does not include white lines on the road. In this case, by detecting the individual area A or C as an optimum focus position, it is possible to increase the focusing accuracy of a subsequent AF control.

In the second embodiment described above, the image-capturing apparatus automatically detects the focus area and performs focus adjustment according to the image-capturing scene. Compared to the first embodiment, there is an effect of increasing the focusing accuracy by the AF by detecting an area having a high contrast evaluation value. Thereby, the focus adjustment suitable for the tilt control can be easily performed, and a desired depth-of-field expansion effect can be obtained in a subsequent tilt control. Note that the optimum focus area detection described here is a representative example, and elements (noise information, motion information such as the presence or absence of moving objects) related to the AF focusing accuracy other than the contrast evaluation value and luminance information may be added. Further, here, a contrast AF is assumed, and detection methods in the other AF methods are not limited to this.

Third Embodiment

Figure 11:
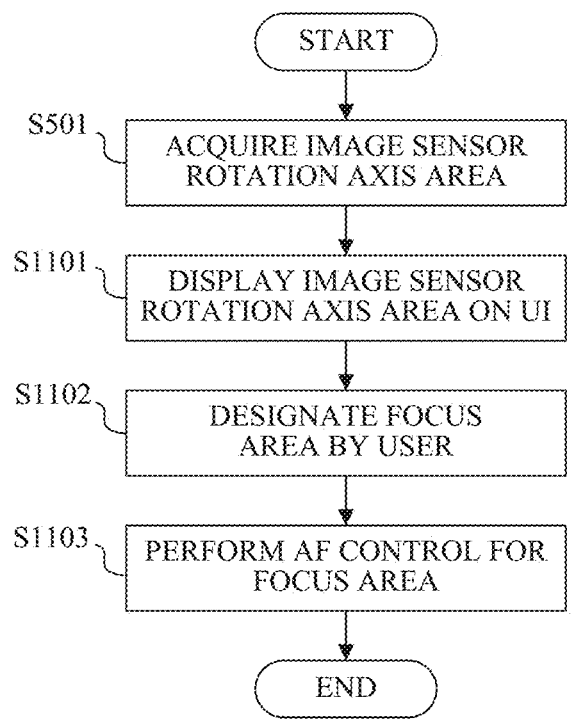
FIG. 11 is a flowchart of a main process executed by the image-capturing apparatus according to the third embodiment.

Hereinafter, a process executed by the image-capturing apparatus according to the third embodiment will be described with reference to the flowchart of FIG. 11. Note that the same processes as those in the first and second embodiments are denoted by the same reference numerals, and description thereof is omitted.

<Step S1101>

In step S1101, the image sensor rotation axis area acquired in step S501 is displayed on a user interface (UI) (display unit) such as the surveillance monitor apparatus 111. This is because the focus adjustment area in the tilt control is indicated to the user, thereby preventing a focus adjustment error, and thus a failure that a desired depth-of-field expansion effect cannot be obtained by the tilt control. Although the image sensor rotation axis area is displayed here, in combination with the first and second embodiments, the tilt focus area detected in step S502, the focus area detected in step S503, or the optimum focus area detected in step S801 may be displayed.

<Step S1102>

In step S1102, the user sets the focus area. Specifically, when the user selects a desired tilt focus area from the image sensor rotation axis area displayed in step S1101, the focus area suitable for the tilt control is set.

<Step S1103>

In step S1103, the AF control is performed so that the focus area set by the user in step S1102 is in focus.

In the third embodiment described above, an area for the focus adjustment in the tilt control is presented to the user. Thereby, the focus adjustment suitable for the tilt control can be reliably performed, and a desired depth-of-field expansion effect can be obtained in a subsequent tilt control.

Fourth Embodiment

Hereinafter, a process executed by the image-capturing apparatus according to the fourth embodiment will be described with reference to the flowchart of FIG. 12. Note that the same processes as those in the first, second, and third embodiments are denoted by the same reference numerals, and description thereof is omitted.

Figure 12:
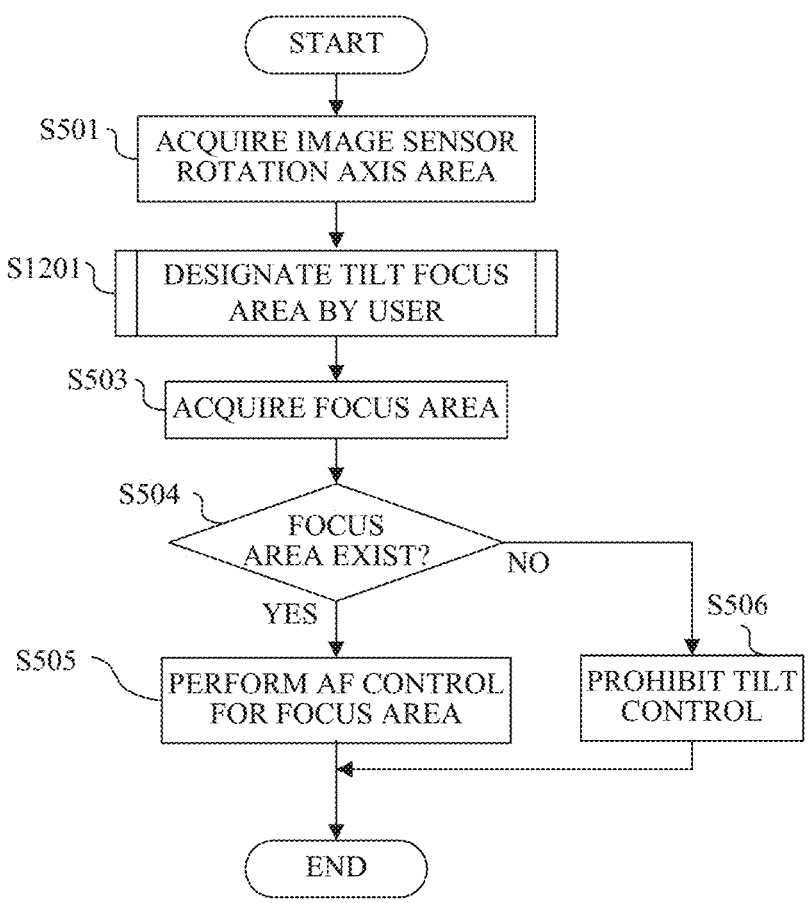
FIG. 12 is a flowchart of a main process executed by the image-capturing apparatus according to the fourth embodiment.

FIG. 12 is a flowchart showing a main process in this embodiment.

<Step S1201>

Figure 13A:
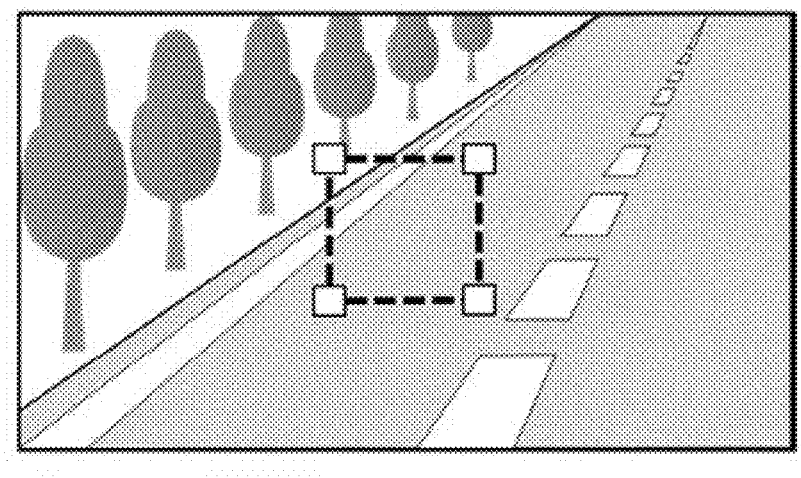
FIGS. 13A and 13B show an example of a tilt focus area designated by a user.
Figure 13B:
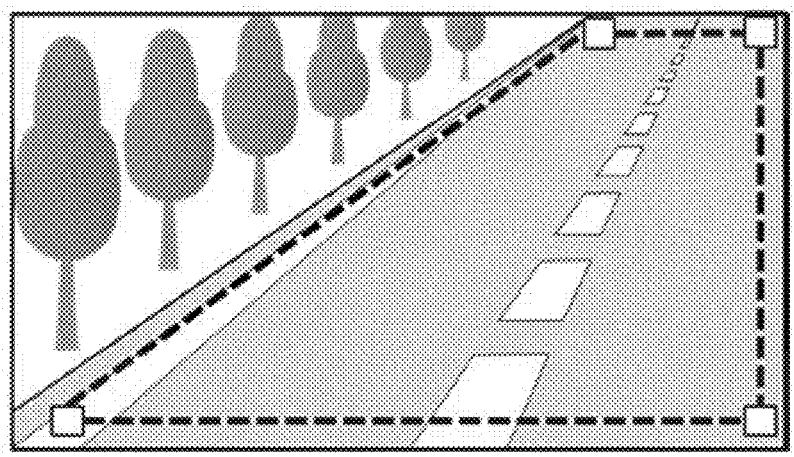

In step S1201, the user designates the tilt focus area using an area designator. The designation of the tilt focus area is performed via a user interface (UI) (display unit) such as the surveillance monitor apparatus 111. For example, the tilt focus area is displayed as a polygon having a plurality of vertices (FIG. 13A). An initial position and size of the polygon may be set in accordance with a user operation (such as click or drag). By arranging the vertices of the polygon at arbitrary positions, the tilt focus area can be freely designated (FIG. 13B).

In the fourth embodiment described above, the user arbitrarily designates the tilt focus area. In accordance with the designated tilt focus area, the image-capturing apparatus automatically detects the focus area and performs focus adjustment. Thereby, the focus adjustment suitable for the tilt control can be reliably performed, and a desired depth-of-field expansion effect can be obtained in a subsequent tilt control.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-006071, filed on Jan. 17, 2019 and Japanese Patent Application No. 2019-200145, filed on Nov. 1, 2019 which are hereby incorporated by reference herein in their entirety.

What is claimed is:

1. An image-capturing apparatus comprising:
a hardware processor; and
a memory configured to store instructions to be executed by the hardware processor,
wherein when the instructions stored in the memory are executed by the hardware processor, the image-capturing apparatus functions as:
a controlling unit configured to perform tilt control in which an image sensor is tilted about a rotation axis with respect to a plane orthogonal to an optical axis of an image-capturing optical system;
a focus controlling unit configured to control a position of a focus lens;
a first area determining unit configured to determine a first area corresponding to the rotation axis in a captured image;
a second area determining unit configured to determine a second area which is an area to be focused by the tilt control; and
a third area determining unit configured to determine a third area in which the first area and the second area overlap, and
wherein the controlling unit performs the tilt control after the position of the focus lens is adjusted so that the third area is in focus.

2. The image-capturing apparatus according to claim 1, wherein the first area is an area having a predetermined width with the rotation axis as a center line.

3. The image-capturing apparatus according to claim 1, wherein the second area determining unit determines the second area based on object distance information in at least one of a plurality of areas in the captured image.

4. The image-capturing apparatus according to claim 3, wherein each of the plurality of areas is composed of a single pixel or a collection of a plurality of pixels.

5. The image-capturing apparatus according to claim 3, wherein the second area determining unit determines, as the second area, an area in which the object distance information in each of the plurality of areas continuously changes in a direction orthogonal to the rotation axis.

6. The image-capturing apparatus according to claim 3, wherein
the second area determining unit acquires the object distance information in order from an area of the plurality of areas at a bottom in a direction orthogonal to the rotation axis, and in a case where a difference between the object distance information of a pair of adjacent areas is more than or equal to a predetermined value, determines a lower area in the pair of adjacent areas as the second area.

7. The image-capturing apparatus according to claim 1, wherein when the instructions stored in the memory are executed by the hardware processor, the image-capturing apparatus further functions as:
a fourth area determining unit configured to determine a fourth area,
wherein the fourth area determining unit determines the fourth area from the third area based on at least one of contrast information, luminance information, noise information, and motion information.

8. The image-capturing apparatus according to claim 7, wherein the fourth area determining unit divides the third area into a plurality of areas, and determines the fourth area from the third area, based on at least one of contrast information, luminance information, noise information, and motion information in each of the plurality of areas.

9. The image-capturing apparatus according to claim 1, wherein in a case where the third area determining unit does not determine the third area, the controlling unit executes at least one of prohibiting the tilt control, notifying a user, setting an area closest to the second area in the first area as the third area, and adjusting an image-capturing angle of view so that the third area can be determined.

10. The image-capturing apparatus according to claim 1, wherein the second area determining unit determines the second area based on an area designated by a user.

11. The image-capturing apparatus according to claim 10, wherein the area designated by the user is composed of a plurality of vertices.

12. The image-capturing apparatus according to claim 10, wherein the area designated by the user is set so as to include a point or line designated by the user.

13. The image-capturing apparatus according to claim 10, wherein at least one of the plurality of vertices of the area designated by the user can be arranged at an arbitrary position.

14. The image-capturing apparatus according to claim 1 further comprising
a rotator configured to rotate the image sensor around the rotation axis.

15. An image-capturing apparatus comprising:
a hardware processor; and
a memory configured to store instructions to be executed by the hardware processor,
wherein when the instructions stored in the memory are executed by the hardware processor, the image-capturing apparatus functions as:
a controlling unit configured to perform tilt control in which an image sensor is tilted about a rotation axis with respect to a plane orthogonal to an optical axis of an image-capturing optical system;
a focus controlling unit configured to control a position of a focus lens;
a first area determining unit configured to determine a first area corresponding to the rotation axis in a captured image; and
a second area determining unit configured to determine a second area which is an area to be focused by the tilt control, and to determine, as the second area, an area in which the object distance information in each of a plurality of areas in the captured image continuously changes in a direction orthogonal to the rotation axis,
wherein the controlling unit performs the tilt control after the position of the focus lens is adjusted so that a third area in which the first area and the second area overlap is in focus.

16. A control method of an image-capturing apparatus comprising:
performing tilt control in which an image sensor is tilted about a rotation axis with respect to a plane orthogonal to an optical axis of an image-capturing optical system;
controlling a position of a focus lens;
determining a first area corresponding to the rotation axis in a captured image;
determining a second area which is an area to be focused by the tilt control; and
determining a third area in which the first area and the second area overlap, and
wherein the tilt control is performed after the position of the focus lens is adjusted so that the third area is in focus.

17. A non-transitory computer-readable storage medium storing a computer program that causes a computer to execute the control method according to claim 16.

* * * * *